United States Patent [19]
Wilson et al.

[11] 3,870,404
[45] Mar. 11, 1975

[54] MIRROR ACTUATOR AND SUPPORT MEANS THEREFOR

[75] Inventors: Harold R. Wilson; Marc A. Kamerling, both of Holland, Mich.

[73] Assignee: Donnelley Mirrors, Inc., Holland, Mich.

[22] Filed: May 1, 1973

[21] Appl. No.: 356,075

[52] U.S. Cl. ................................................. 350/281
[51] Int. Cl. .................................................. B60r 1/04
[58] Field of Search .................... 350/281, 280, 279

[56] References Cited
UNITED STATES PATENTS
| | | | |
|---|---|---|---|
| 3,507,562 | 4/1970 | Yamashita et al. | 350/281 |
| 3,561,848 | 2/1971 | Cunningham | 350/281 |

FOREIGN PATENTS OR APPLICATIONS
| | | | |
|---|---|---|---|
| 1,227,736 | 4/1971 | Great Britain | 350/281 |
| 1,237,454 | 3/1967 | Germany | 350/281 |

*Primary Examiner*—John K. Corbin
*Attorney, Agent, or Firm*—Price, Heneveld, Huizenga & Cooper

[57] ABSTRACT

A vibration minimizing actuator for pivotally shifting the piston of a mirror case and mirror element of a day-night rearview mirror assembly and means for supporting the same within the mirror case. The mirror case and element are pivoted about a pivot axis by a pivotal toggle assembly included on the actuator, the plane parallel to the front of the mirror and including the pivot axis being spaced as close as possible to the parallel plane including the center of gravity of the case and element. The support means enable easy insertion, secure retention, and precise positioning of the actuator in the day-night positions as well as control of the force required to pivot the assembly between day and night positions.

27 Claims, 14 Drawing Figures

MIRROR ACTUATOR AND SUPPORT MEANS THEREFOR

This invention relates to rearview mirror assemblies for vehicles which are shiftable between at least a full reflectivity day position and a reduced reflectivity night position and, more particularly, to a position shifting actuator and support means for the actuator in such an assembly which minimize vibration transmitted through the actuator to the mirror element.

BACKGROUND OF THE INVENTION

Vehicular day-night mirror assemblies which are shiftable between two or more positions to provide a daytime image of full intensity and a night time image of a reduced intensity to minimize the effects of headlight glare and the like are very well known. Typically, such assemblies have included actuating elements for moving either the mirror element or the mirror case in which the mirror element is fixedly constrained from one position to another with respect to the actuating element. One reoccurring problem in the use of such prior known assemblies on vehicles has been the amount of vibration transmitted from the vehicle through the mirror support to the actuating element which, because of the nature of its support within the mirror assembly, ultimately transmits the vibration to the mirror element itself. The result is often an inadequate and blurred image for the viewer of the mirror. Although many attempts have been made to overcome this problem, including rigidifying the actuating elements and/or their supports within the mirror assemblies, the prior assemblies have generally failed to sufficiently overcome the vibrational problem.

An associated problem is that of providing strong, secure supports for retaining the actuating element in such mirror assemblies, without distortion of either the back or sides of the case. Precise control of the position of the actuating element, which in turn controls the position of the image for the viewer, has been difficult with prior devices. Further, certain prior supports have failed to provide adequate retention of the actuator in its various shifted positions in conditions of severe vibration, impact, and the like. Moreover, assembly of actuating elements in their supports in some of the prior mirrors has required time consuming, tedious and expensive production procedures.

SUMMARY OF THE INVENTION

Accordingly, it is the purpose of the present invention to provide an actuator for shifting a mirror case and a mirror element retained and supported therein between at least a full reflectivity day position and a reduced reflectivity night position, the actuator reducing and minimizing vibration transmitted from the vehicle to the mirror element. A related purpose is to provide support means which may be molded integrally with the mirror case for supporting the actuator, the support means being pivotable to allow easy insertion of the actuator during assembly and securely lockable in an actuator retaining position via integral locking means included on the support means. Consequently, the support means greatly facilitate the assembly of the actuator in the mirror case since all separate securing means such as rivets and the like are eliminated, thereby obviating the need for careful, tedious assembly procedures. Additionally, the support means allow precise control over the day-night positions of the actuator and mirror assembly by providing positive abutment surfaces limiting the pivotal travel of the actuator. They also securely retain the actuator for positive control of the force required to shift the assembly position via the actuator.

In the preferred embodiment, the support means securing the actuator within the mirror case comprise two upstanding support walls extending transversely across the width of the case in an integral area of the case located centrally behind the mirror element. The two support walls are hinged to the back of the case by an integral hinge such that they are pivotable away from one another for insertion of the actuator therebetween. Pivotal locking tabs or members are included on the support members for locking the supports in their upright positions after insertion of the actuator.

The actuator comprises a molded thermoplastic body in the preferred embodiment including two axles at either end thereof, the bottom axle adjacent one end of the body being hinged to a spring member via an integral thermoplastic hinge thereby providing a toggle axis for shifting the position of the assembly. The remaining or upper axle provides a pivot axis around which the assembly is pivoted by shifting the actuator between its day and night positions.

The effects of vehicular vibration transmitted are minimized because the plane including pivot axis of the mirror assembly about which it pivots when the actuator is shifted is spaced as close as possible to the plane including the center of gravity of the assembly. In the preferred embodiment, the upper axle including the pivot axis for the assembly is spaced a lesser distance from the center of gravity of the assembly than is the pivot or toggle axis of the toggle assembly. The result is a reduction of the moment of the force of gravity acting through the center of gravity which, in turn, minimizes the oscillation or vibration of the assembly about the upper axle pivot axis. Accordingly, a clearer, sharper image on the mirror is produced for the viewer thereof.

Assembly of the complete mirror including the present actuator and support means therefore is effectively simplified with respect to many prior known mirror assemblies. The supports need only be spread apart, the actuator inserted therebetween, and the supports returned to and locked in their upright positions by means of the locking members.

These and other objects, advantages, purposes and features of the invention will become more apparent from a study of the following description taken in conjunction with the drawings.

DESCRIPTION OF THE PREFERRED EMBODIMENT

Figure 1:
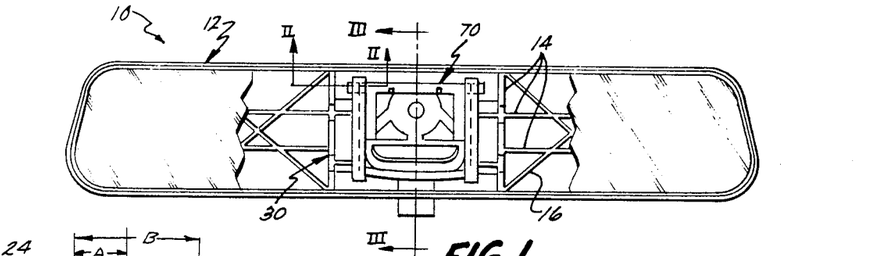
FIG. 1 is a front elevation of a mirror assembly with portions broken away showing the day-night mirrow assembly actuator and support means therefore of the present invention.
Figures 2, 3:
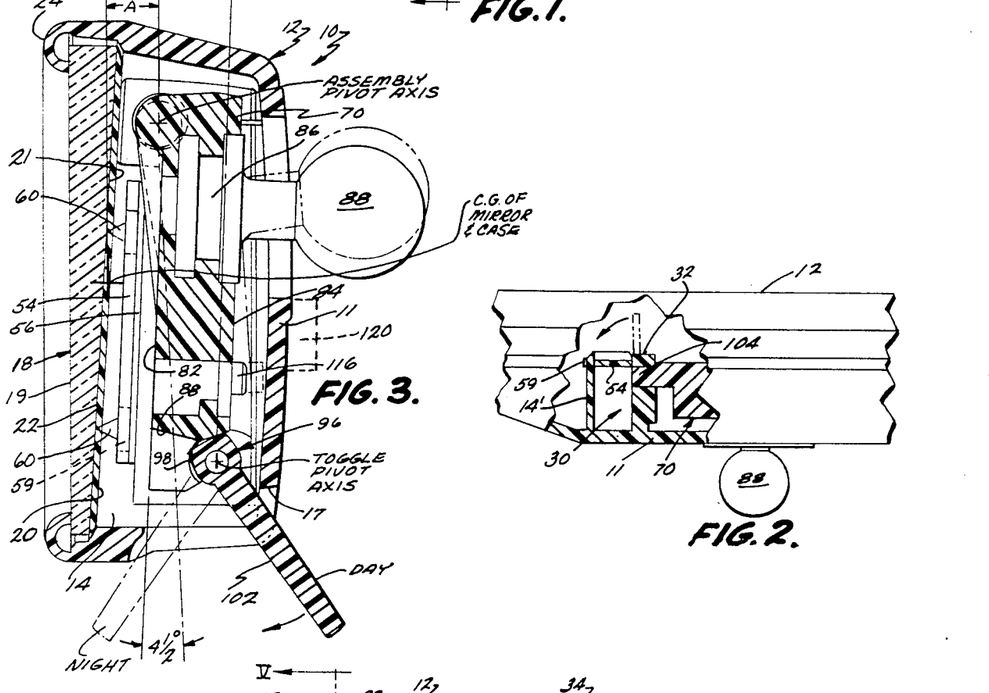
FIG. 2 is a fragmentary, side view of the mirror assembly with portions broken away showing an end view of the assembled actuator and support means taken along plane II—II of FIG. 1.
FIG. 3 is an end elevation of the mirror assembly taken along plane III—III of FIG. 1.

Referring now to the drawings in greater detail, FIGS. 1–3 illustrate a complete day-night, rearview mirror assembly 10 including a pivotable, toggle-type actuator 70 and integral support means 30 for the actuator. Generally, the mirror assembly 10 includes a molded, thermoplastic mirror case 12 having a length greater than its width. The case is preferably of the type disclosed in co-pending application Ser. No. 356,074, filed May 1, 1973, entitled MIRROR CASE AND EDGE FORMING METHOD THEREFOR, filed concurrently herewith, invented by Arthur W. Kurz, Jr. and Harold R. Wilson, and assigned to the same assignee as the present invention. The molded case 12 is generally of a hollow construction having a shell of thermoplastic material, a back wall 11 spaced behind a mirror element 18, integral mirror element support ribs 14 and structural cross-members 16. The support ribs generally run perpendicular to one another, i.e., both parallel to the lengthwise dimension of the case and transversely across the width of the case, as illustrated in FIG. 1. These support members support the back of the mirror element 18 which preferably includes a resilient, impressionable layer 20 of a resinous material such as polyvinyl chloride (PVC) applied in a plastisol form followed by heat curing. Cross members 16 are included to strengthen the case and to reduce the effects of torsional forces on the case.

The mirror element 18 is preferably a transparent, prismatic element of glass, plastic or the like having non-parallel front and back surfaces 19 and 21, respectively. The back surface has a layer 22 of reflective material such as metallic silver or the like intermediate layer 20 and the back surface. The mirror element 18 is held within the molded case 12 by a formed, curled edge 24 such that portions of the support ribs 14 are forced into the layer 20 to reduce and minimize the vibration of the mirror element within the case. The entire assembly is very light in weight and provides a convenient integral area for the support and mounting of the actuator 70 and mounting means 30 therefor.

Figure 5:
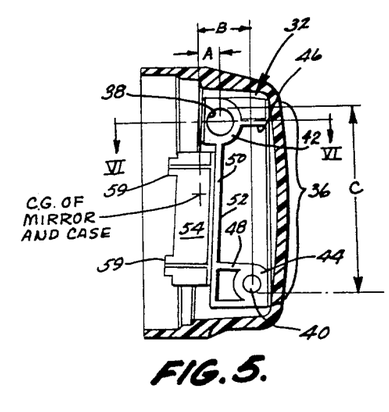
FIG. 5 is a cross-sectional, end elevation of the mirror case and actuator support means taken along line V—V of FIG. 4.
Figure 6:
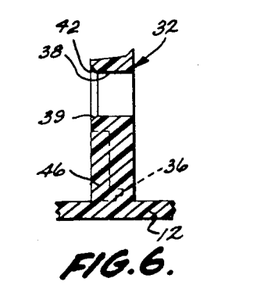
FIG. 6 is a fragmentary, cross-sectional, end elevation of a portion of the actuator support means taken along plane VI—VI of FIG. 5.
Figure 7:
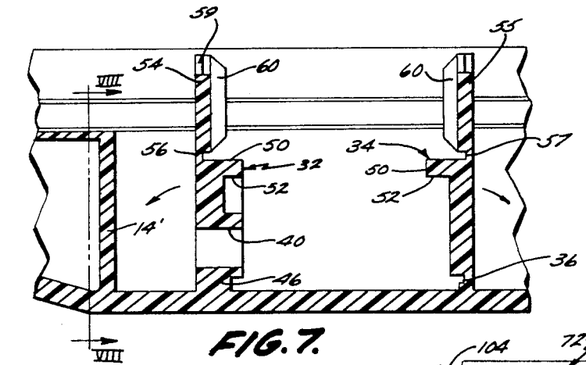
FIG. 7 is a fragmentary, cross-sectional side view of the actuator support means taken along line VII—VII of FIG. 4.
Figure 8:
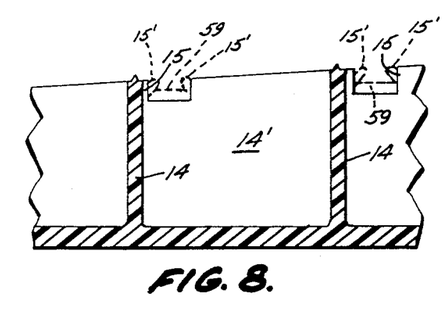
FIG. 8 is a fragmentary, cross-sectional end view of a portion of the mirror element support ribs in the mirror case, the ribs including means for receiving the locking tabs on the support means taken along plane VIII—VIII of FIG. 7.

Referring now to FIGS. 4–8, support means 30 comprise two generally rectangular, upstanding support members or walls 32 and 34 which are molded integrally with the back of the case 12 such that they extend generally transverse across the width of the case generally behind the mirror element 18. The support walls are pivotally secured to the inside of the back of the case by a hinge area 36. (See FIGS. 3 and 5–7) Hinge areas 36 are of a reduced thickness less than the thickness of the remainder of the walls 32 and 34 thereby providing sufficient flexibility to allow the support members to be pivoted towards the ends of the case as indicated in FIG. 7.

Support members 32 and 34 also include cylindrical apertures or receptacles 38, 38' and 40, 40' which receive the ends of the axles of the actuator 70 when inserted between the support members. These apertures are generally circular in cross section having diameters slightly larger than the diameters of the corresponding axles on the actuator and may be beveled or countersunk as at 39 to facilitate insertion of the actuator axles (FIG. 6). As will be seen in FIGS. 3 and 5, the plane including the pivot axis or axis extending through the centers of receptacles 38, 38' is offset a perpendicular distance A from the plane including the center of gravity of the combined mirror element and case including the support means 30 but excluding the actuator 70, while the plane including the pivot axis extending through the centers of receptacles 40, 40' is offset a greater distance B from that plane including the center of gravity. In the preferred embodiment, distance A is approximately 0.25 inches while distance B is approximately 0.45 inches. The receptacles 38 and 40 and 38' and 40' are spaced apart in a direction generally parallel to the back of the case as shown in FIG. 5 such that the greatest distance between the circumferences of the receptacles is a distance C. Since the mirror case and element actually pivot about the axis of the axle inserted in receptacles 38, 38' when the position of the assembly is shifted between day and night positions, the location of the receptacles 38, 38' and the corresponding axle as close as possible to the center of gravity reduces the moment of force about the pivot point thereby greatly reducing and minimizing the oscillatory effects of vibration transmitted through the stationary actuator.

Receptacles 38, 38' and 40, 40' are reinforced about their circumferences by annular or partially annular projecting collars 40 and 42, respectively, in order to strengthen the retention of the actuator therein. Further, integral ribs 46 and 48 extend across the width of the support members generally perpendicular to the back of the case to further strengthen the support member. Ribs 46 and 48, in the are adjacent the hinge area 36, provide a foot or brace which prevents the support members from being pivoted toward one another beyond their upright positions. Additionally, the inside surfaces of the two support members 32 and 34 are recessed except for collars 42 and 44, ribs 46 and 48, and a peripheral extending edge 50 which forms an undercut ledge surface 52 facing the rear of the inside of the case 12. Ledge surface 52 forms an abutment which limits the pivotal movement of the actuator toward the mirror element when received between the support members.

As shown in FIGS. 2–5 and 7 and 8, locking members 54 and 55 are formed integrally with the surfaces of support members 32 and 34 which are adjacent the back of the mirror element 18. Locking members 54 and 55 extend along a portion of the length of the support members and are hinged thereto by integral hinge areas 56 and 57 which allow the locking members to be pivoted to a position generally at right angles with the support members 32 and 34 as shown in FIG. 2. Each of the locking members includes projecting tabs 59 which extend beyond the lateral edge of each member. Tabs 59 correspond in size to generally rectangular apertures 15 formed in support ribs 14' (FIG. 8), which ribs extend generally parallel to the support members 32 and 34 but are spaced a distance toward the ends of the case from the outside surfaces thereof. Since the overall width of each locking member 54 and 55 is the same as the distance between support ribs 14' and support members 32 and 34, and since the apertures 15 are sized to correspond to tabs 59, the locking members 54 and 55 may be pivoted over such that tabs 59 are fitted into apertures 15 to retain the support members in their upright positions after insertion of the actuator 70 therebetween (See FIG. 2). Additionally, the sides 15' may be formed over the tabs 59 to retain the tabs therein. When secured in this manner, the support members are prevented from pivoting about their own hinge areas and securely retain the actuator 70 via its axles.

Locking members 54 and 55 also include upstanding tapered fins 60 extending across the width of the locking members. These fins project into the resilient, impressionable layer 20 on the back of the mirror element 18 when the locking tabs are pivoted into their locking positions as shown in FIG. 3. Accordingly, when the mirror element is firmly seated in the case 12, tapered fins 60 prevent lateral shifting and vibration of the mirror element across the width of the case but allow longitudinal expansion of the mirror element as is explained in the co-pending application Ser. No. 356,074, filed May 1, 1973, mentioned above.

Figure 9:
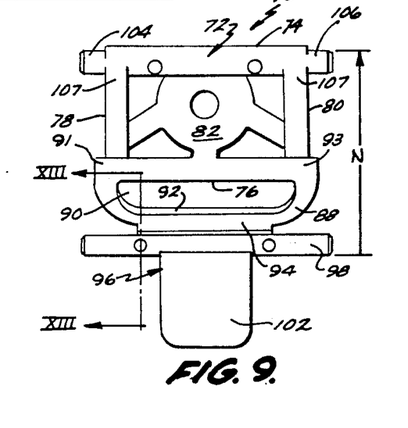
FIG. 9 is a front elevation of the actuator of the present invention.
Figure 10:
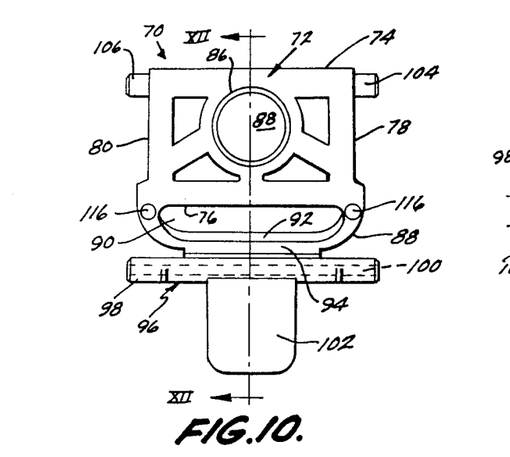
FIG. 10 is a rear elevation of the actuator shown in FIG. 9.
Figure 11:
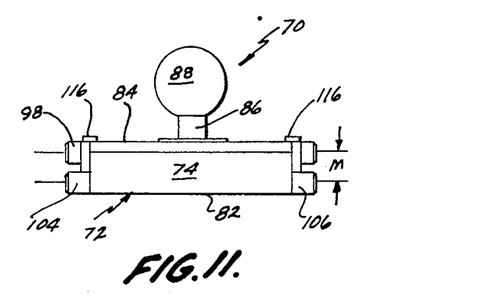
FIG. 11 is a plan view of the actuator shown in FIGS. 9 and 10.
Figure 12:
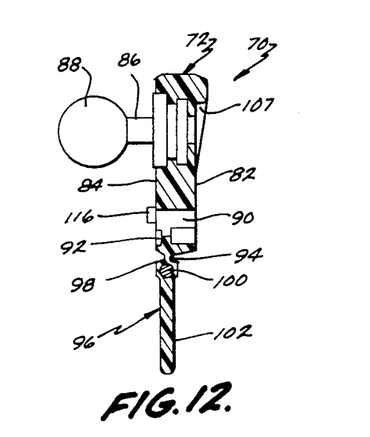
FIG. 12 is a cross-sectional, side elevation of the actuator taken along plane XII—XII of FIG. 10.
Figure 13:
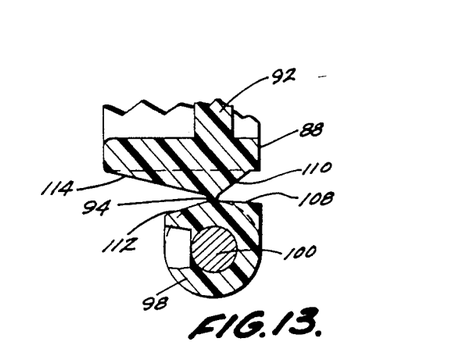
FIG. 13 is an enlarged, fragmentary, cross-sectional, side elevation of the hinge area and lower axle of the actuator taken along plane XIII—XIII of FIG. 9.

Referring now to FIGS. 9–13, the actuator 70 comprises a body 72 having a top and bottom ends 74 and 76 respectively as well as lateral sides 78 and 80. The body also includes a front surface 82 and a rear surface 84 from which a steel or aluminum support projection 86, having an integral ball member 88, extends generally normally thereto. The support projection 86 is molded integrally into the actuator 70 as shown in FIG. 12 such that it projects normally to the rear surface 84 and out of the case for connection to a support external of the assembly on a vehicle. Extending below the lower end 76 is a generally U-shaped, spring biasing member 88 which is molded integrally with the body 72 joining it at the lower corners thereof and forming shoulders 91 and 93. The U-shaped spring member 88 defines an open area 90 between the lower end 76 and its internal surface as shown in FIGS. 9, 10 and 12. The spring member includes an integral reinforcing rib 92 which extends around its interior surface to increase its strength.

Hinged to the bottom surface of spring member 88 by an integral, thermoplastic hinge 94 is a toggle assembly 96 including a continuous cylindrical axle 98 including a metallic or other rigid reinforcing member 100 located centrally therein. Axle 98 extends generally parallel to the planes including the front and rear surfaces 82 and 84 of body 72 laterally beyond either side 78 and 80 of the body. Axle 98 also includes a pivot tab 102 extending radially therefrom such that the toggle assembly 96 may be pivoted about the axis of axle 98 via hinge 94 in order to shift the actuator 70 when it is supported between support members 32 and 34.

Cylindrical, coaxial, axle spindles 104 and 106 extend from lateral sides 78 and 80 respectively of the body adjacent the top end 74 thereof. Spindles 104 and 106 are generally parallel to and extend in the same direction as continuous axle 98 and are braced by struts 107 (FIGS. 9 and 12). The pivot axis of coaxial spindles 104 and 106 is offset however, from the pivot axis of continuous axle 98 a distance M as shown in FIG. 11. Further, the outside circumferential surfaces of the spindles 104 and 106 and continuous axle 98 are spaced apart a distance N as shown in FIG. 9. Distance N is slightly greater than the maximum distance C between the circumferences of receptacles 38 and 40 and 38' and 40' in support members 32 and 34 as shown in FIG. 5.

Figure 4:
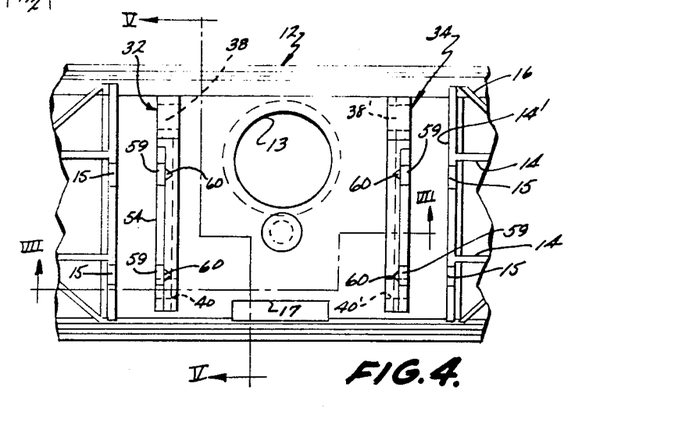
FIG. 4 is a fragmentary, front elevation of the actuator support means molded integrally in a suitable mirror case prior to the insertion of the actuator therein.

The assembly of the actuator in support members 32 and 34 will now be understood with reference to FIGS. 1–3. The offset axle 98 and spindles 104 and 106 are received in receptacles 38, 38', 40 and 40' after support members 32 and 34 have been pivoted towards the ends of the case to provide sufficient room for insertion of the actuator. Thereafter, the support members are pivoted back to their upright positions with the axles located securely in the receptacles after which the locking members 54 and 55 are pivoted into their securing positions with tabs 59 being snapped into apertures 15 in support ribs 14'. In this respect, circular aperture 13 is provided in the rear of the case to allow the support 86 including ball member 88 to be passed therethrough for securement to a support external of the mirror assembly. Further, a generally L-shaped aperture 17 is provided in the bottom and side of the case 12, as shown in FIGS. 3 and 4, to allow the toggle assembly 96, including pivot tab 102, to extend therethrough for shifting the position of the actuator 70. Since the distance N between the outside circumferences of the axles is slightly greater than the distance C between the circumferences of the receptacles 38 and 40, the spring member 88 is forced to flex inwardly in compression and axle 98 bows or bends slightly downwardly to conform to the shorter distance between the receptacles (See FIG. 1). The spring member 88 thereby forces the axles and spindles 98 and 104 and 106, respectively, away from one another which in turn biases the actuator 70 into either its day or night position depending upon the position of pivot tab 102 and axle 98. The one piece support members 32 and 34 allow the spring member to be retained in its compressed state to positively control the biasing action. In this respect, other mirror assemblies utilize portions of the back and sides of the case to provide support for an actuator. With this type of prior assembly the case is distorted when the actuator is shifted between positions. However, with the present support members 32 and 34, there is direct support of the actuator axles within the support members. In other words, the solid material directly between the axle receptacles holds the axles in their correct positions without reliance on the back or side shell of the case.

Figure 3A:
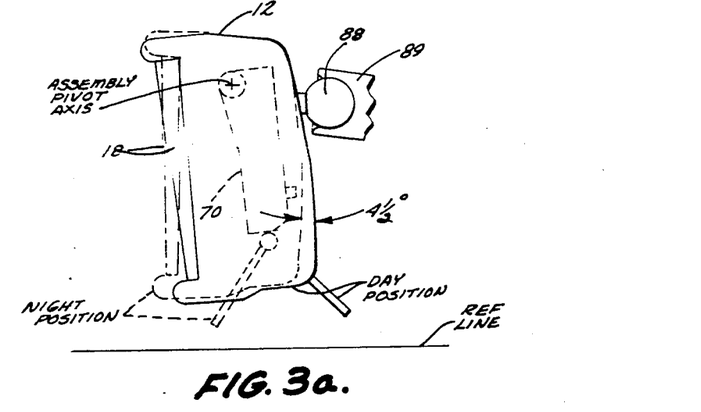
FIG. 3a is an end elevation of the mirror assembly showing the shift in position of the case between its day and night positions.

Once in position, the actuator 70 may be pivoted between its day and night positions by moving the toggle assembly 96 between the two positions shown in FIG. 3. This pivotal shift causes a corresponding pivotal movement of the case and mirror element about the assembly pivot axis when support 86 and ball member 88 are held in a fixed position such as by external support 89. (FIG. 3a) Thus, the case and mirror rotate instead of the actuator moving as shown in FIG. 3. In the day position, pivot tab 102 is in its rearwardly directed position with the inclined pressure surfaces 108 and 110 (FIG. 13) abutting against one another. These pressure surfaces prevent the actuator from pivoting too far toward the mirror element with the help of the contact between shoulder areas 91 and 93 (FIG. 9) contacting the undercut ledge surface 52 on support members 32 and 34. The undercut ledge precisely limits the position of the actuator 70 with the front surface 82 of actuator 70 being held generally parallel to the rear surface 21 and reflective layer 22 of the mirror element. The assembly position is adjusted via ball member 88 in fixed external support 89 such that light rays are directly reflected from layer 22 to a viewer or driver when the toggle assembly is in the day position. A shift to the night position will then correctly position front surface 19 to provide a reduced intensity image.

When it is desired to reduce the intensity of the reflected light from the mirror element, the pivot tab 102 is rotated to the night position shown in FIG. 3. Ball member 88 is held in a fixed position by a support 89 (FIG. 3a) external of the mirror assembly and rotation of the pivot tab and continuous axle 98 to the night position causes the mirror case 12 and mirror element 18 to pivot about the assembly pivot axis of spindles 104 and 106 a distance equivalent to the amount of travel shown for ball member 88 in FIG. 3. In the preferred embodiment the case 12 and mirror element 18 rotate upwardly approximately 4 ½° (FIG. 3a) around the axis of spindles 104 and 106. Shifting the actuator brings the front surface 19 of mirror element 18 generally parallel to the front face 82 of actuator 70 such that the reflective layer 22 reflects the majority of light against the roof of the vehicle while the uncoated, front face 19 provides a reduced reflectivity image of approximately 3 to 5 percent incident light rays. The precise precision of the actuator 70 in the night position is controlled by inclined pressure surfaces 112 and 114 on continuous axle 98 and the lower surface of spring member 88 as well as by cylindrical stop projections 116 (FIGS. 3 and 10-12). Projections 116 abut against the inside of the rear of case 12 in the night position as shown in FIG. 3.

As mentioned above, the effects of vibration transmitted through support projection 86 to actuator 70 and thence to case 12 and mirror element 18 are reduced since the distance between the center of gravity of the mirror case and mirror element (including support means 30 but excluding actuator 70) and the pivot axis of spindles 104 and 106 is as small as possible. As shown in FIG. 3, the perpendicular distance A between the parallel planes including the center of gravity and the assembly pivot axis, both of which are generally parallel to the front surface 19 of mirror element 18, is made as close to zero as possible. Thus, in the optimum case, the assembly pivot axis would be brought generally into alignment with the plane which is generally parallel to the front surface 19 of mirror element 18 and includes the center of gravity. In the normal position of the assembly in a vehicle, the pivot axis extends generally horizontally while the parallel planes including the center of gravity and pivot axis extend generally vertically. With such alignment, the moment of the force of the center of gravity about the pivot axis would be reduced to zero, thereby also eliminating the effects of vibration or oscillation about the pivot axis. Such a result can be obtained by reducing the distance A in FIG. 3 to zero by changing the pivot axis position, which would entail a change in configuration of the case and assembly, or by adding sufficient mass or weight, such as to the back of the case at 120, to change the center of gravity and bring it into generally vertical alignment with the assembly pivot axis. However, in the preferred embodiment of the case of the illustrated configuration and without weights 120, very minimal and negligible levels of vibration or oscillation of the assembly can be obtained with distance A at approximately 0.20 inches. The effects of vibration are still very small and much less than in prior known day-night mirror assemblies with the distance A up to approximately 0.25 inches. Accordingly, the vibrational effects are effectively minimized for the present type of case with the distance A within the range of between zero and about 0.25 inches, the effects of vibration being reduced as distance A approaches zero. The approximate 0.25 inch limit for this range is for a glass prismatic mirror having an approximate 2 inch by 12 inch viewing area and a thickness of about 0.20 to 0.22 inches at the top edge and about 0.09 to 0.10 inches at the lower edge.

For assemblies including larger, thicker or heavier mirrors in cases having the same general configuration as the present case, this approximate limit (0.25) for producing relatively negligible vibrational effect would be proportionately reduced according to the increase in size or weight. Similarly, for similar type cases having smaller, thinner or lighter mirror elements, this approximate limit (0.25) would be proportionately increased according to the decrease in size or weight.

The entire mirror assembly except for the mirror element 18, projecting support 86 and reinforcing rod 100, are preferably molded from the same thermoplastic material thereby greatly facilitating the production of the case, actuator and support means therefore. A suitable thermoplastic material is polypropylene which has the characteristics of being light in weight, resilient, wear resistant and yet is easily formable and has high strength. It also has excellent long life flexing characteristics. Preferably, both the case with the integral support members and locking members, as well as the separate actuator 70, are injection molded in suitable molds.

As will now be understood, the present invention comprising actuator 70 and support means 30 may be included in any type of mirror case wherein there is sufficient area existing behind the general location of the mirror element. The invention provides several advantages over prior known actuator and support systems. The effects of vibration transmitted from the vehicle through the actuator to the mirror case and element are reduced to a minimum. Further, the unitary support members are very strong and retain the actuator securely therebetween. This retention maintains sufficient compression on the spring member to provide a sufficient biasing force to hold the actuator in either its day or night position, even in conditions of severe vibration or jolts. Additionally, the integral elements of the support members and actuator enable the precise control of the position of the actuator in either its day or night position. Moreover, assembly of the actuator in the molded case is greatly simplified and merely requires a spreading apart of the support members, insertion of the actuator, a closing of the support members about the actuator and locking the support members in their upright position.

While one form of the invention has been shown and described, other forms will now be apparent to those skilled in the art. Therefore, it will be understood that the embodiment shown in the drawings and described above is merely for illustrative purposes, and is not intended to limit the scope of the invention as defined by the claims which follow.

The embodiments of the invention in which an exclusive property or privilege is claimed are defined as follows:

1. A day-night mirror assembly comprising a mirror case, a prismatic mirror element having non-parallel, generally planar front and back surfaces supported and retained therein, and an actuator means for shifting said case and mirror element with respect to a support external of said assembly between a predetermined reflectivity day position and a reduced reflectivity night position, said actuator means including two side edges and two spaced, generally parallel shaft means for supporting said actuator means in said case; said case including spaced support means for pivotally supporting said actuator means therebetween; said support means including a one-piece support member adjacent and along each side edge of said actuator means, each of said support members including means defining apertures having completely closed peripheries for receiving the ends of both of said shaft means along one side edge of said actuator means whereby said two shaft means and their corresponding apertures are maintained in the same spaced relationship by said one-piece support member throughout said shifting of said case and mirror; said support members being movable with respect to one another to permit insertion of said actuator means; and locking means for positively securing said support members following insertion of said actuator means to retain said actuator means in position in said case.

2. The assembly of claim 1 wherein said actuator means is pivotable between at least two positions and includes a generally planar front surface area and stop projections extending from portions of its rear surface; said spaced support member positioned on either side of said actuator means and including recesses and stop ledges; said actuator means having portions of said front surface are extending into said recesses such that when said actuator means is pivoted to said day position, said front surface abuts against said stop ledges retaining said front surface of said actuator means generally parallel to said rear surface of said prismatic mirror element, said rear surface having a reflective layer thereon; and when said actuator means is pivoted to said night position, said stop projections abut against said case back to retain said front surface of actuator means generally parallel to the uncoated front surface of said prismatic mirror element.

3. The assembly of claim 1 wherein said actuator means comprises an actuator member having a body with opposing sides, opposing ends, and a specified thickness; said shaft means including an axle at one end of said actuator member with ends projecting beyond said sides, and two coaxial spindles at the other end of said actuator member, said spindles projecting beyond said sides generally parallel to said axle, and integral tab means projecting from said axle for pivoting the same with respect to said body; each of said spaced support members comprising elongated, upstanding walls positioned on either side of said actuator member; said support members including coaxial apertures receiving said spindles and axle ends; said mirror case, including said support members and said mirror element, having a center of gravity; the plane including the pivot axis of said spindles and corresponding coaxial apertures being spaced a perpendicular distance from the plane including said center of gravity to minimize the effects of vibration transmitted to said assembly through said actuator; said planes being parallel to said front planar surface of said mirror element.

4. The assembly of claim 3 wherein the pivot axis of said axle and corresponding coaxial apertures is offset from said center of gravity a distance greater than is said pivot axis of said coaxial spindles and their coaxial apertures.

5. The assembly of claim 4 wherein said apertures in said support members for said spindles are countersunk to facilitate insertion of said spindles therein.

6. The assembly of claim 1 wherein said mirror assembly, including said support members and said mirror element but excluding said actuator means, has a center of gravity; said means defining apertures defining two sets of receptacles for pivotally supporting said shaft means of said actuator means, each of said receptacles having a closed periphery; one set of said receptacles receiving axle means which are a portion of said shaft means, said axle means having a pivot axis about which said mirror assembly pivots when said actuator is shifted between said day and night positions; said pivot axis included in a plane parallel to said front surface of said mirror element, said plane spaced a predetermined perpendicular distance from a second plane also parallel to said front surface of said mirror element and including said center of gravity.

7. The assembly of claim 1 wherein said locking means include projecting means for preventing said mirror element from shifting laterally across the widthwise dimension of said case.

8. A day-night mirror assembly comprising a mirror case, a prismatic mirror element having non-parallel, generally planar front and back surfaces supported and retained therein, and an actuator means for shifting said case and mirror element with respect to a support external of said assembly between a predetermined reflectivity day position and a reduced reflectivity night position, said actuator means including two side edges and two spaced, generally parallel shaft means for supporting said actuator means in said case; said case including spaced support means for pivotally supporting said actuator means therebetween; said support means including a one-piece support member adjacent and along each side edge of said actuator means, each of said support members including means defining apertures for receiving said shaft means whereby said two shaft means and their corresponding apertures are maintained in the same spaced relationship throughout said shifting of said case and mirror; said support members being movable with respect to one another to permit insertion of said actuator means; and locking means for positively securing said support members following insertion of said actuator means to retain said actuator means in position in said case; said mirror case having a back and longitudinal and widthwise dimensions, said support members extending generally transverse to said longitudinal dimensions and generally parallel to said widthwise dimension; said support members including hinge means for hinging said members to said case back such that they are pivotable towards the longitudinal ends of said case.

9. The assembly of claim 8 wherein said case is molded from a thermoplastic material; said support members comprising two generally rectangular, elongated, upstanding walls molded integrally from said thermoplastic material with said case; said shaft means including axles extending beyond said side edges of said actuator means at either end of said actuator means; said apertures formed adjacent each end of each of said upstanding walls; said hinge means comprising hinges also molded integrally from said thermoplastic material; said thermoplastic hinges being inherently sufficiently resilient and flexible to allow pivoting of said walls to allow said insertion of said actuator therein.

10. A day-night mirror assembly comprising a mirror case, a prismatic mirror element having non-parallel, generally planar front and back surfaces supported and retained therein, and an actuator means for shifting said case and mirror element with respect to a support external of said assembly between a predetermined reflectivity day position and a reduced reflectivity night position; said case including spaced support means for pivotally supporting said actuator means therebetween; said support means being movable with respect to one another to permit insertion of said actuator means; and locking means for positively securing said support means following insertion of said actuator means to retain said actuator means in position in said case; said mirror case having a back and longitudinal and widthwise dimensions, said support means comprising support members extending generally transverse to said longitudinal dimension and generally parallel to said widthwise dimension; said support members including hinge means for hinging said members to said case back such that they are pivotable towards the longitudinal ends of said case; said case being molded from a thermoplastic material; said support members comprising two generally rectangular, upstanding walls molded integrally from said thermoplastic material with said case; said walls having apertures formed therein for receiving said actuator; said hinge means comprising hinges also molded integrally from said thermoplastic material; said thermoplastic hinges being inherently sufficiently resilient and flexible to allow pivoting of said walls to allow said insertion of said actuator therein; said case including at least one upstanding, stationary support rib molded generally parallel to and adjacent each of said walls in said case for supporting said mirror element and strengthening said case; said locking means comprising locking members on said walls molded integrally with said walls from said thermoplastic material and integral hinges molded from said thermoplastic material hingedly securing said locking members to said walls; said support ribs including apertures for receiving tabs formed on said locking members; said locking members being pivotable about said hinges such that said tabs are fitted into said rib apertures after insertion of said actuator between said walls to retain said walls generally parallel to said support ribs and generally normal to the front surface of said mirror element.

11. A day-night mirror assembly comprising a mirror case, a prismatic mirror element having non-parallel, generally planar front and back surfaces supported and retained therein, and an actuator means for shifting said case and mirror element with respect to a support external of said assembly between a predetermined reflectivity day position and a reduced reflectivity night position, said actuator means including two side edges and two spaced, generally parallel shaft means for supporting said actuator means in said case; said case including spaced support means for pivotally supporting said actuator means therebetween; said support means including a one-piece support member adjacent and along each side edge of said actuator means, each of said support members including means defining apertures for receiving said shaft means whereby said two shaft means and their corresponding apertures are maintained in the same spaced relationship throughout said shifting of said case and mirror; said support members being movable with respect to one another to permit insertion of said actuator means; and locking means for positively securing said support members following insertion of said actuator means to retain said actuator means in position in said case; said spaced support members including hinge means pivotally securing them to said case; said locking means including hinge means hingedly securing said locking means to said support members.

12. In a day-night rearview mirror assembly for vehicles including a mirror case having a back, and a prismatic mirror element having non-parallel, generally planar front and back surfaces supported and retained therein; a mirror assembly actuator having connecting means for securing the same to a support external of said assembly; and toggle means for shifting the position of said mirror case and mirror element between a predetermined reflectivity day position and a reduced reflectivity night position, said mirror case and mirror element having a center of gravity, the improvement comprising: two generally parallel, shaft means spaced a predetermined first distance apart for pivotally supporting said actuator and corresponding support members including receptacle means for receiving said supporting shaft means, said receptacle means in said support members spaced apart a predetermined second distance, said support members including connecting means separate from said case back and extending between said receptacles for maintaining said predetermined spacing of said receptacle means constant including during the shifting of said mirror case and element; one of said supporting shaft means and its corresponding receptacle means in said support members comprising a pivot axis about which said mirror case and mirror element pivot when shifted between said positions; said pivot axis included in a first plane parallel to said front surface of said mirror element; said first plane spaced a minimal perpendicular distance from a second plane including said center of gravity whereby the effects of vibration transmitted through said actuator to said assembly are minimized.

13. The mirror assembly of claim 12 wherein said first plane is spaced between said second plane and the back of said case.

14. The mirror assembly of claim 12 wherein said one supporting shaft means comprise two coaxial, cylindrical axle projections; the other of said supporting shaft means comprising a continuous axle; said axle projections and said continuous axle extending beyond either side of said actuator at either end thereof; said axle projections and continuous axle being substantially parallel to one another and extending in substantially the same directions.

15. The mirror assembly of claim 12 wherein said actuator includes a body; said toggle means comprising a cylindrical axle having a pivot axis, the two ends of said axle comprising the other of said supporting shaft means, said ends pivotally received in said receptacle means in said support members; said axle having a toggle tab extending radially therefrom and an integral hinge connecting said axle to said body; said one of said supporting shaft means comprising two coaxial, cylindrical spindles extending generally parallel to and in the same direction as said axle from either side of said actuator; said spindles pivotally received in another portion of said receptacle means in said support members; the pivot axis of said axle lying in a third plane parallel to said front surface of said mirror element; said third plane spaced a perpendicular distance from said second plane which is greater than said distance of said first plane from said second plane.

16. The mirror assembly of claim 15 wherein said actuator body includes an integral spring member; said axle being hingedly connected to said spring member; the outside surfaces of said axle and coaxial spindles being spaced apart said predetermined first distance parallel to the widthwise dimension of said case; said receptacle means being spaced apart said second distance which is less than said predetermined first distance between said axle and spindles such that said spring member is placed in compression to bias said actuator into one of said day or night positions.

17. In a day-night rearview mirror assembly for vehicles including a mirror case having a back, and a prismatic mirror element having non-parallel, generally planar front and back surfaces supported and retained therein; a mirror assembly actuator having connecting means for securing the same to a support external of said assembly; and toggle means for shifting the position of said mirror case and mirror element between a predetermined reflectivity day position and a reduced reflectivity night position, said mirror case and mirror element having a center of gravity, the improvement comprising: two generally parallel, shaft means spaced a predetermined first distance apart for pivotally supporting said actuator and corresponding support members including receptacle means for receiving said supporting shaft means, said receptacle means in said support members spaced apart a predetermined second distance, said support members including means for maintaining said predetermined spacing of said receptacle means constant including during the shifting of said mirror case and element; one of said supporting shaft means and its corresponding receptacle means comprising a pivot axis about which said mirror case and mirror element pivot when shifted between said positions; said pivot axis included in a first plane parallel to said front surface of said mirror element; said first plane spaced a perpendicular distance from a second plane including said center of gravity whereby the effects of vibration transmitted through said actuator to said assembly are minimized; said support members being elongated, upstanding support walls extending along and adjacent the sides of said actuator, said support members being formed integrally with said case and including hinges connecting them to said case and allowing said members to be pivoted away from one another for insertion of said actuator therebetween; said support members further including hinged locking members for securing said support members in position after insertion of said actuator; said receptacle means including receptacles having closed peripheries; said means for maintaining said spacing of said receptacle means including continuous portions of said upstanding support walls in which said receptacles are formed.

18. An actuator for vehicular mirror assemblies adapted to shift a mirror case including a prismatic mirror element between at least a predetermined reflectivity day position and a reduced reflectivity night position, said actuator comprising a body having front and back surfaces and a predetermined thickness therebetween, two sides, and two ends, two generally parallel axle means each having a pivot axis for pivotally supporting said actuator in a mirror case; biasing means for biasing said axle means away from one another; toggle means supporting one of said axle means for pivoting said actuator between said day and night positions; and integral hinge means for connecting said toggle means to said biasing means; the pivot axis of the other of said axle means being included in a first plane extending through said body generally parallel to said front surface; said hinge means spaced to one side of and offset from said first plane; said toggle means providing means for pivoting said one axle means toward and away from said offset first plane; and cylindrical stop members on said back surface and projecting outwardly therefrom for accurately positioning said actuator within said mirror case when received in a case.

19. The actuator of claim 18 wherein said actuator is molded in one piece from a thermoplastic material with said axle means, biasing means, toggle means and hinge means being molded integrally together; said actuator including a support member molded therein and projecting normally from said back surface for supporting a mirror assembly including said actuator from a support external of such an assembly.

20. The actuator of claim 18 wherein said one of said axle means comprises a continuous axle located adjacent one end of said body and having ends extending beyond either side of said body; said one axle forming a portion of said toggle means and being pivotally connected to said biasing means via said hinge means.

21. The actuator of claim 20 wherein said other of said axle means comprise two coaxial spindles extending from either side of body adjacent the end of said body opposite said one end, said spindles extending in the same direction as the ends of said continuous axle; said spindles having their common pivot axis closer to said front surface of said actuator than the axis of said continuous axle.

22. The actuator of claim 21 wherein said spindles and continuous axle are substantially cylindrical; said continuous axle including a reinforcing rod member located centrally therein, a pivot tab extending radially therefrom, and said hinge means comprising a hinge of molded, thermoplastic material extending radially from said axle to said biasing means in a direction opposite the direction of extension of said pivot tab.

23. The actuator of claim 20 wherein said biasing means comprises a generally U-shaped member formed integrally with said body with a cross member spaced from and extending generally parallel to one of said ends of said body and said continuous axle; said cross member and said axle each including inclined surfaces on either side of said hinge means; said inclined surfaces on each side of said hinge means respectively abutting one another when said actuator is in each of said day and night positions to define the extent of pivoting of said actuator when positioned in a mirror case.

24. A mirror case for receiving both a mirror element and an actuator for shifting the position of said case and mirror element with respect to a fixed support; said actuator being of the type including front and rear surfaces, side edges, end edges, and two generally parallel shaft means for supporting said actuator in said case; said case including spaced, one-piece support members adapted to receive such an actuator therebetween, one support member extending along and adjacent either side edge of the actuator when fitted in the case; each of said support members including receptacles spaced a predetermined distance apart therein for receiving the shaft means and pivotally supporting the actuator and connecting means extending between said receptacles for maintaining said receptacles in said predetermined spacing during shifting of the actuator; means for movably securing said support members to said case for movement with respect to one another for insertion of the actuator; and locking means for securing said support means after insertion of the actuator to retain the actuator therein.

25. The mirror case of claim 24 wherein said locking means is included on said support members.

26. The mirror case of claim 24 wherein said case includes a back wall; said receptacles in said spaced support members including sets of spaced, coaxial receptacles, each receptacle having a closed periphery; each of said sets being offset a different distance from said back wall.

27. A mirror case for receiving a mirror element and an actuator for shifting the position of said case and mirror element with respect to a fixed support; said actuator being of the type including front and rear surfaces, side edges, end edges, and two generally parallel shaft means for supporting said actuator in said case; said case including spaced, one-piece support members adapted to receive such an actuator therebetween, one support member extending along and adjacent either side edge of the actuator when fitted in the case; said support members including receptacles spaced a predetermined distance apart therein for receiving the shaft means and pivotally supporting the actuator while maintaining said receptacles in said predetermined spacing during shifting of the actuator; means for movably securing said support members to said case for movement with respect to one another for insertion of the actuator; and locking means for securing said support means after insertion of the actuator to retain the actuator therein; said support members, locking means and case being integrally molded from a thermoplastic material; said means for moving said support members including hinge means for pivotally hinging said support members to said case; said locking means comprising locking tabs each pivotally hinged to a portion of a said support member.

* * * * *

UNITED STATES PATENT OFFICE
CERTIFICATE OF CORRECTION

PATENT NO. : 3,870,404
DATED : March 11, 1975
INVENTOR(S) : Harold R. Wilson and Marc A. Kamerling It is certified that error appears in the above-identified patent and that said Letters Patent are hereby corrected as shown below:

In the Abstract, line 2;
    "piston" should be --position--;
Column 4, line 59;
    "are" should be --area--;
Column 9, line 52;
    "member" should be --members--;
Column 9, line 55;
    "are" should be --area--;
Column 11, line 8;
    "dimensions" should be --dimension--.

Signed and Sealed this twenty-third Day of September 1975

[SEAL]

Attest:

RUTH C. MASON
Attesting Officer

C. MARSHALL DANN
Commissioner of Patents and Trademarks